April 2, 1929.  R. V. WHITE ET AL  1,707,746
PUMP FOR MOTOR VEHICLE AIR BRAKES
Filed Aug. 28, 1926  3 Sheets-Sheet 1
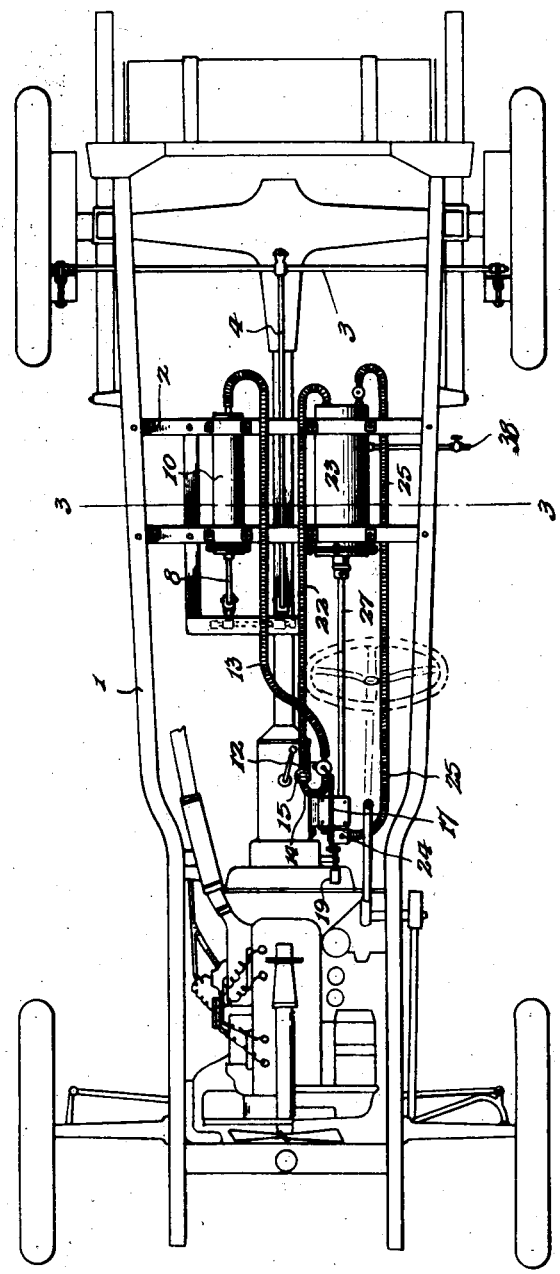
Inventors
R. V. White.
P. D. Wynn.
By Lacy & Lacy, Attorneys

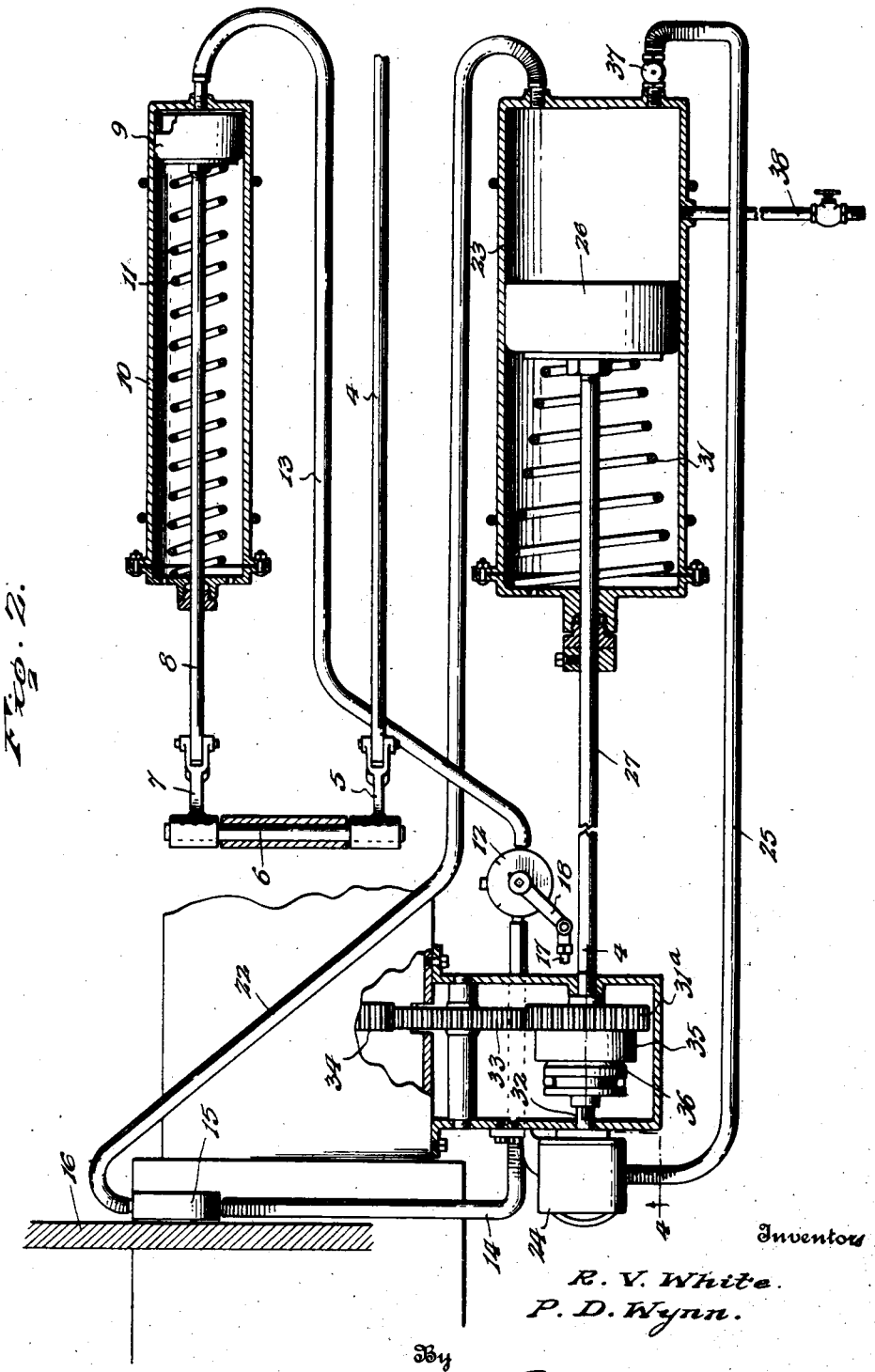

April 2, 1929. R. V. WHITE ET AL 1,707,746
PUMP FOR MOTOR VEHICLE AIR BRAKES
Filed Aug. 28, 1926   3 Sheets-Sheet 3
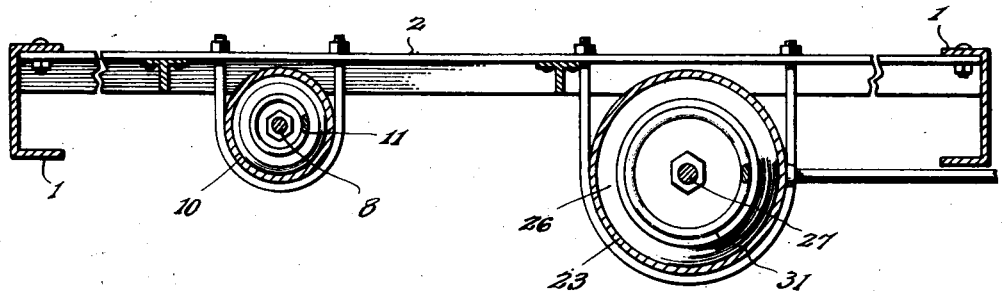
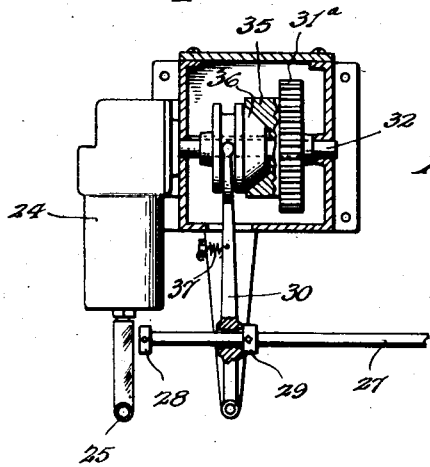
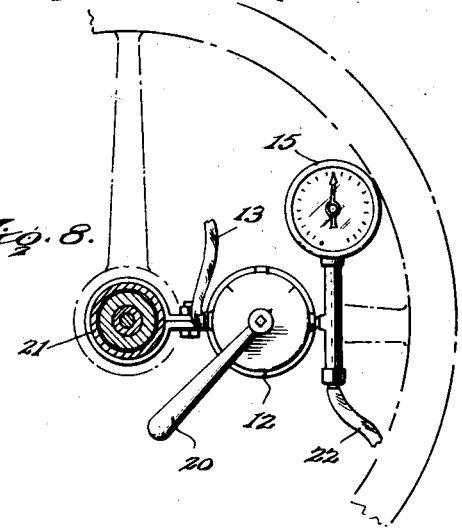
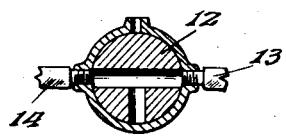
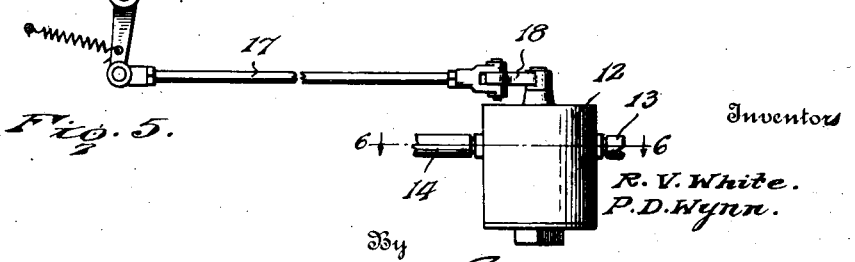

Patented Apr. 2, 1929.

1,707,746

UNITED STATES PATENT OFFICE.

REX V. WHITE, OF MOUND VALLEY, KANSAS, AND PERRY D. WYNN, OF OSAGE, OKLAHOMA, ASSIGNORS OF ONE-THIRD TO WILLIAM A. BROOKS, OF MARLAND, OKLAHOMA.

PUMP FOR MOTOR-VEHICLE AIR BRAKES.

Application filed August 28, 1926. Serial No. 132,188.

This invention relates to brake mechanism for automobiles and motor vehicles generally, whereby pneumatic pressure is utilized to set the brakes when the same are applied.

The invention relates to a system whereby a given air pressure is created and maintained, the action being automatic to throw an air compressor into gear for storing air and out of gear when the predetermined pressure of air has been reached.

The invention contemplates a brake operating cylinder and a manually operable valve for admitting compressed air into the brake cylinder for applying the brakes and for releasing the air from the brake cylinder when the brakes are to be freed.

While the drawings illustrate a preferred embodiment of the invention, it is to be understood that in adapting the means to meet specific needs and requirements the design may be varied and such other changes in the minor details of construction may be resorted to within the scope of the invention as claimed, without departing from the spirit thereof.

For a full understanding of the invention and the merits thereof, reference is to be had to the following description and the drawings hereto attached, in which,—

Figure 1 is a top plan view of the chassis of a motor vehicle provided with a pneumatic brake system embodying the invention.

Figure 2 is a fragmentary sectional view of the brake system showing the parts on a larger scale.

Figure 3 is a detail sectional view on the line 3—3 of Figure 1, showing the parts on a larger scale.

Figure 4 is a detail view of the air compressure and the clutch mechanism for automatically throwing the same into and out of gear.

Figure 5 is a detail view of a manually operable valve for controlling the admission of compressed air to the brake cylinder and releasing such pressure therefrom.

Figures 6 and 7 are sectional views of the valve on the line 6—6, of Figure 5, Figure 6 showing the valve in position to admit compressed air to the brake cylinder and Figure 7 showing the position of the valve when releasing the air from the brake cylinder, and Figure 8 is a diagrammatic view of a different arrangement of air controlling valve.

Corresponding and like parts are referred to in the following description and designated in the several views of the drawings by like reference characters.

The numeral 1 designates the side bars of the chassis of a motor vehicle, and 2 cross bars connecting the same. The brake beam 3 may be mounted in any determinate way so as to apply the brakes when required and said brakes may be of any approved construction, depending upon the make of the vehicle and the arrangement of the brake elements. A brake rod 4 is connected at one end with the brake beam 3 and at its opposite end with an arm 5 projecting from a rock shaft 6 which is suitably mounted and provided with a second arm 7 which is connected to the rod 8 of a piston 9 arranged to operate in a cylinder 10 constituting the brake cylinder. A spring 11 housed within the brake cylinder 10 normally exerts a pressure upon the piston 9 to hold it at the limit of its rearward movement within the cylinder, that is, when the brakes are released. The brake cylinder 10 may be conveniently positioned and supported in any determinate way according to the make of vehicle equipped with the invention.

A three-way valve 12 of the type substantially shown in Figures 6 and 7 is conveniently positioned and a pipe 13 connects one of the ports with an end of the brake cylinder 10. A pipe 14 connects another port of the valve 12 with a pressure indicator 15 mounted upon the dash 16 of the vehicle, or otherwise conveniently positioned for observation. The third port of the valve opens into the atmosphere, as shown most clearly in Figures 6 and 7, whereby to vent the brake cylinder when the plug of the valve is turned to assume the position indicated in Figure 7. The valve 12 may be controlled in any determinate way, either by foot, as indicated most clearly in Figure 5, or by hand, as shown in Figure 8. A rod 17 connects an arm 18 of the valve 12 with a foot lever 19. As illustrated in Figure 8, a handle 20 is fitted to the plug or movable part of the valve, and the latter is shown mounted upon the steering column 21. A pipe 22 connects the pressure indicator 15 with a tank or storage reservoir 23 for holding the air under pressure. The tank 23 may be conveniently located and supported in any preferred or determinate way.

The numeral 24 designates an air pump or compressor of any approved type and a pipe 25 connects the air compressor 24 with an end of the tank 23, preferably the end to which the pipe 22 is connected. A piston 26 disposed within the tank 23 has its rod 27 passing through a stuffing box provided at the opposite end of the tank, the purpose being to prevent any loss of pressure. The piston rod 27 is provided with spaced collars 28 and 29 adjustably connected thereto by means of set screws and which constitute stops for operating a lever 30, whereby the compressor is automatically thrown into and out of gear. A coil spring 31 housed within the tank 23 normally exerts a pressure upon the piston 26 to hold the same at the limit of its movement in one direction, that is, when the pressure within the tank 23 is below a given point. The tank or reservoir 23 is of cylindrical form and the piston 26 obtains a close fit therein to prevent loss of pressure. The compressor 24 is adapted to be driven from a rotating part of the operating mechanism of the vehicle and, as shown, a gear wheel 31$^a$ loose on the shaft 32 of the compressor is in mesh with a gear wheel 33, which in turn derives power from the idle gear 34 of the transmission. In this manner the gear wheel 31$^a$ is continuously driven when the motor of the vehicle is running. A clutch element 35 rotatable with the gear wheel 31$^a$ cooperates with a companion clutch element 36 splined to the compressor shaft 32 and when the clutch elements 35 and 36 are in engagement the compressor 24 is operated to supply air to the tank 23 through the pipe 25. As the air pressure accumulates in the tank 23, the piston 26 is moved against the tension of the spring 31, and when the predetermined pressure has been obtained the piston 26 and rod 27 assume a position to bring the stop 29 in position to operate the lever 30 to throw the clutch element 36 out of engagement with the clutch element 35, whereby the air compressor is thrown out of action. As the pressure within the tank 23 reduces by operation of the brake, the piston 26 moves under the tension of the spring 31 and when the pressure falls to a predetermined low point, the piston 26 and rod 27 assume a position to bring the stop 28 in engagement with the lever 30, whereby the clutch element 36 is engaged with the clutch element 35 to throw the air compressor into gear, whereby the tank 23 is recharged with air to the required pressure which, when attained, operates to throw the air compressor out of gear in the manner stated. A spring 37 normally holds the clutch out of engagement until positively operated by the stop 28 coming in contact with the lever 30, when the tension of the spring 37 is overcome by the tension of the spring 31.

In the operation of the invention it is assumed that the tank or reservoir 23 is charged with air at a pressure to apply the brakes when the valve 12 is operated to admit air into the brake cylinder 10. As the air enters the brake cylinder the piston 9 is moved therein and effects a rocking of the shaft 6 whereby the brake beam 3 is moved and the brake applied. When the valve 12 is moved to the position indicated in Figure 7, the pressure is released from the brake cylinder and the piston 9 is returned to normal position by the action of the spring 11, the air from the brake cylinder, escaping into the atmosphere through the vent port of the valve. As the pressure of air in the reservoir 23 lowers the piston 26 is moved by the action of the spring 31 and at a given point in the movement of the piston 26, the stop 28 on the rod 27 comes in contact with the lever 30 and moves the same to throw the clutch member 36 into engagement with the clutch member 35, whereby the compressor is thrown into gear and operates to recharge the tank or reservoir 23. A check valve 37 in the length of the pipe 25 prevents loss of pressure when the air pump is inactive. A pipe 38 is connected to the air tank 23 and provides convenient means for supplying air to tires, for inflating the same when required.

Having thus described the invention, we claim:

In a pneumatic air brake system for motor vehicles, the combination of a storage tank, an air compressor for charging said tank, operating means for the air compressor including a clutch and clutch operating lever, a piston movable within the storage tank and actuated by the change of pressure therein, a spring within the tank for moving the piston in opposition to the air pressure, a rod extended from the piston through a head of the tank, and stops adjustable on the rod and disposed on opposite sides of the clutch operating lever for throwing the compressor operating mechanism into and out of gear.

In testimony whereof we affix our signatures.

REX V. WHITE. [L. S.]
PERRY D. WYNN. [L. S.]